United States Patent
Gangadhar

(10) Patent No.: US 6,862,362 B2
(45) Date of Patent: Mar. 1, 2005

(54) PARITY-GRID STEGANOGRAPHIC METHOD AND APPARATUS

(75) Inventor: Deepak K Gangadhar, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 10/000,212

(22) Filed: Nov. 2, 2001

(65) Prior Publication Data

US 2003/0086609 A1 May 8, 2003

(51) Int. Cl.$^7$ ............................................. G06K 9/00
(52) U.S. Cl. ...................................................... 382/100
(58) Field of Search .......................... 382/100, 162, 382/199

(56) References Cited

U.S. PATENT DOCUMENTS

| | | | |
|---|---|---|---|
| 5,748,763 A | 5/1998 | Rhoads | |
| 6,011,849 A | 1/2000 | Orrin | |
| 6,606,393 B1 | * 8/2003 | Xie et al. | 382/100 |
| 6,665,420 B1 | * 12/2003 | Xie et al. | 382/100 |
| 6,697,498 B2 | * 2/2004 | Kawaguchi et al. | 382/100 |
| 6,707,927 B1 | * 3/2004 | Kita et al. | 382/100 |
| 6,725,372 B1 | * 4/2004 | Lewis et al. | 713/176 |

OTHER PUBLICATIONS

Wu et al. "Image Refining Technique Using Digital Watermarking." IEEE Trans. on Consumer Electronics, vol. 46, no. 1, Feb. 2000, pp. 1–5.*

Lee et al. "A Watermarking Sequence Using Parities of Error Control Coding for Image Authentication and Correction." IEEE Trans. on Consumer Electronics, vol. 46, no.2, May 2000, pp. 313–317.*

* cited by examiner

*Primary Examiner*—Jon Chang
(74) *Attorney, Agent, or Firm*—Anthony V S England; T. Rao Coca; Manny Schecter

(57) ABSTRACT

A method and apparatus for generating a parity grid matrix from an indexed data representation are disclosed. The method includes the steps of calculating a parity value for each of specified rows and columns of the indexed representation, determining a parity restoration value for each of the specified rows and columns that exhibit a non-zero parity value, and adding the parity restoration values to one or more selected elements of the specified rows and columns that exhibit a non-zero parity value. A method and apparatus for embedding and retrieving information in/from data representations such as images, by use of a parity grid matrix, are also disclosed.

42 Claims, 10 Drawing Sheets

|    | C1 | C2 | | | | | C7 |
|----|----|----|----|----|----|----|----|
| R1 | 5  | 10 | 9  | 5  | 3  | 2  | 0  |
| R2 | 1  | 5  | 9  | 2  | 10 | 23 | 20 |
|    | 2  | 8  | 23 | 8  | 3  | 4  | 5  |
|    | 34 | 15 | 1  | 9  | 6  | 6  | 4  |
|    | 8  | 12 | 55 | 21 | 9  | 5  | 5  |
|    | 4  | 6  | 54 | 6  | 8  | 2  | 15 |
| R7 | 7  | 4  | 6  | 4  | 9  | 8  | 1  |

Fig. 2

|    | C1 | C2 | | | | | C7 |
|----|----|----|---|---|---|---|----|
| R1 | 5  | 10 | 9 | 5 | 3 | 2 | 0  |
| R2 | 1  | 5  | 9 | 2 | 10 | 23 | 20 |
|    | 2  | 8  | 23 | 8 | 3 | 4 | 5 |
| ⋮  | 34 | 15 | 1 | 9 | 6 | 6 | 4 |
|    | 8  | 12 | 55 | 21 | 9 | 5 | 5 |
|    | 4  | 6  | 54 | 6 | 8 | 2 | 15 |
| R7 | 7  | 4  | 6 | 4 | 9 | 8 | 1 |

Matrix 910:

| | C1 | C2 | | | | | C7 |
|---|---|---|---|---|---|---|---|
| R1 | 5 | 10 | 9 | 5 | 3 | 2 | 0 |
| R2 | 1 | 5 | 9 | 2 | 10 | 23 | 20 |
| | 2 | 8 | 23 | 8 | 3 | 4 | 5 |
| | 34 | 15 | 1 | 9 | 6 | 6 | 4 |
| | 8 | 12 | 55 | 21 | 9 | 5 | 5 |
| | 4 | 6 | 54 | 6 | 8 | 2 | 15 |
| R7 | 7 | 4 | 6 | 4 | 9 | 8 | 1 |

Matrix 920:

| 4 | 5 | 0 | 3 | -7 | -22 | -20 |
|---|---|---|---|---|---|---|
| -1 | -3 | -14 | -6 | 7 | 19 | 15 |
| -32 | -7 | 22 | -1 | -3 | -2 | 1 |
| 26 | 3 | -54 | -12 | -3 | 1 | -1 |
| 4 | 6 | 1 | 15 | 1 | 3 | -10 |
| -3 | 2 | 48 | 2 | -1 | -6 | 14 |
| -3 | 2 | 48 | 2 | -1 | -6 | 14 |

Matrix 930:

| -5 | 1 | 4 | 2 | 1 | 2 | 2 |
|---|---|---|---|---|---|---|
| -4 | -4 | 7 | -8 | -13 | 3 | 3 |
| -6 | -15 | 15 | 5 | -1 | -1 | -1 |
| 19 | 14 | -8 | 3 | 0 | 2 | 2 |
| -4 | -43 | 34 | 12 | 4 | 0 | 0 |
| -2 | -48 | 48 | -2 | 6 | -13 | -13 |
| 3 | -2 | 2 | -5 | 1 | 7 | 7 |

Matrix 940:

| 9 | 6 | 4 | 5 | 8 | 24 | 22 |
|---|---|---|---|---|---|---|
| 5 | 7 | 21 | 14 | 20 | 22 | 18 |
| 38 | 22 | 37 | 6 | 4 | 3 | 2 |
| 45 | 17 | 62 | 15 | 3 | 3 | 3 |
| 8 | 49 | 35 | 27 | 5 | 3 | 10 |
| 5 | 50 | 96 | 4 | 7 | 19 | 27 |
| 6 | 4 | 50 | 7 | 2 | 13 | 21 |

PARITY-GRID STEGANOGRAPHIC METHOD AND APPARATUS

FIELD OF THE INVENTION

The present invention relates generally to embedding information in digital data and more specifically to embedding authentication information in indexed representations of images.

BACKGROUND

Digital watermarks and signatures are known techniques for embedding information in data. Such data typically comprises a digital representation of information such as a sound recording or an image. These techniques are thus of particular significance in the field of media ownership for overcoming media piracy.

The above techniques provide a means of producing a representation of the original information that has unique information stored therein. The unique information can be extracted at a later time for authentication purposes and/or for claiming ownership of the original information. It can also be used to detect if any unauthorised modifications have been made to the original information. However, many such techniques are complex in implementation and may alter the perceptible appearance of original information.

A need exists to provide a relatively simple method and apparatus for image authentication, wherein authentication information is embedded within an image itself, while substantially preserving the perceptible appearance of the original unauthenticated image.

SUMMARY

According to an aspect of the present invention, there is provided a method for generating a parity grid matrix from an indexed representation of an image. The method includes the steps of calculating a parity value for each of specified rows and columns of the indexed representation, determining a parity restoration value for each of the specified rows and columns that exhibit a non-zero parity value, and adding the parity restoration values to one or more selected elements of the specified rows and columns that exhibit a non-zero parity value.

According to another aspect of the present invention, there is provided a method for detecting alterations to an image. The method includes the steps of calculating a parity value for each of specified rows and columns of a parity grid encoded representation of the image, and determining each non-zero occurrence of the parity values, each non-zero occurrence being indicative of a row or column containing one or more altered elements.

According to another aspect of the present invention, there is provided a method for embedding information in an image. The method includes the steps of generating a parity grid matrix from an indexed representation of the image, selecting elements of the parity grid matrix for alteration, and altering the selected elements according to a representation of the information.

According to another aspect of the present invention, there is provided a method for retrieving information embedded in an image. The method includes the steps of calculating a parity value for each of specified rows and columns of a parity grid encoded representation of the image, and combining each non-zero value of the parity values to reconstruct the embedded information, the information being embedded in the image by alteration of the parity grid encoded representation of the image.

According to another aspect of the present invention, there is provided an apparatus for generating a parity grid matrix from an indexed representation of an image including means for calculating a parity value for each of specified rows and columns of the indexed representation, means for determining a parity restoration value for each of the specified rows and columns that exhibit a non-zero parity value, and means for adding the parity restoration values to one or more selected elements of the specified rows and columns that exhibit a non-zero parity value.

According to another aspect of the present invention, there is provided an apparatus for detecting alterations to an image including means for calculating a parity value for each of specified rows and columns of a parity grid encoded representation of the image, and means for determining each non-zero occurrence of the parity values, each non-zero occurrence being indicative of a row or column containing one or more altered elements.

According to another aspect of the present invention, there is provided an apparatus for embedding information in an image including means for generating a parity grid matrix from an indexed representation of the image, means for selecting elements of the parity grid matrix for alteration, and means for altering the selected elements according to a representation of the information.

According to another aspect of the present invention, there is provided an apparatus for retrieving information embedded in an image including means for calculating a parity value for each of specified rows and columns of a parity grid encoded representation of the image, and means for combining each non-zero value of said parity values to reconstruct the embedded information, the information being embedded in the image by alteration of the parity grid encoded representation of the image.

According to another aspect of the present invention, there is provided a computer program product having a computer readable medium having a computer program recorded therein for generating a parity grid matrix from an indexed representation of an image, the computer program product including computer program code means for calculating a parity value for each of specified rows and columns of the indexed representation, computer program code means for determining a parity restoration value for each of the specified rows and columns that exhibit a non-zero parity value, and computer program code means for adding said parity restoration values to one or more selected elements of the specified rows and columns that exhibit a non-zero parity value.

According to another aspect of the present invention, there is provided a computer program product having a computer readable medium having a computer program recorded therein for detecting alterations to an image, the computer program product including computer program code means for calculating a parity value for each of specified rows and columns of a parity grid encoded representation of the image, and computer program code means for determining each non-zero occurrence of the parity values, each non-zero occurrence being indicative of a row or column containing one or more altered elements.

According to another aspect of the present invention, there is provided a computer program product product having a computer readable medium having a computer program recorded therein for embedding information in an image, the computer program product including computer program code means for generating a parity grid matrix from an indexed representation of the image, computer program code means for selecting elements of the parity grid matrix for alteration, and computer program code means for altering the selected elements according to a representation of the information.

According to another aspect of the present invention, there is provided a computer program product product having a computer readable medium having a computer program recorded therein for retrieving information embedded in an image, the computer program product including computer program code means for calculating a parity value for each of specified rows and columns of a parity grid encoded representation of the image, and computer program code means for combining each non-zero value of the parity values to reconstruct the embedded information, the information being embedded in the image by alteration of the parity grid encoded representation of the image.

BRIEF DESCRIPTION OF THE DRAWINGS

Features and preferred embodiments of the present invention are hereinafter described with reference to the accompanying drawings in which:

FIG. 2 shows a data matrix with every alternate row and column forming a parity grid;

FIG. 3 shows a data matrix with every third row and column forming a parity grid;

FIG. 6 shows a data matrix before and after a signature has been embedded;

FIG. 9 shows a series of data matrices used in a process of edge detection; and

DETAILED DESCRIPTION

Figure 1:
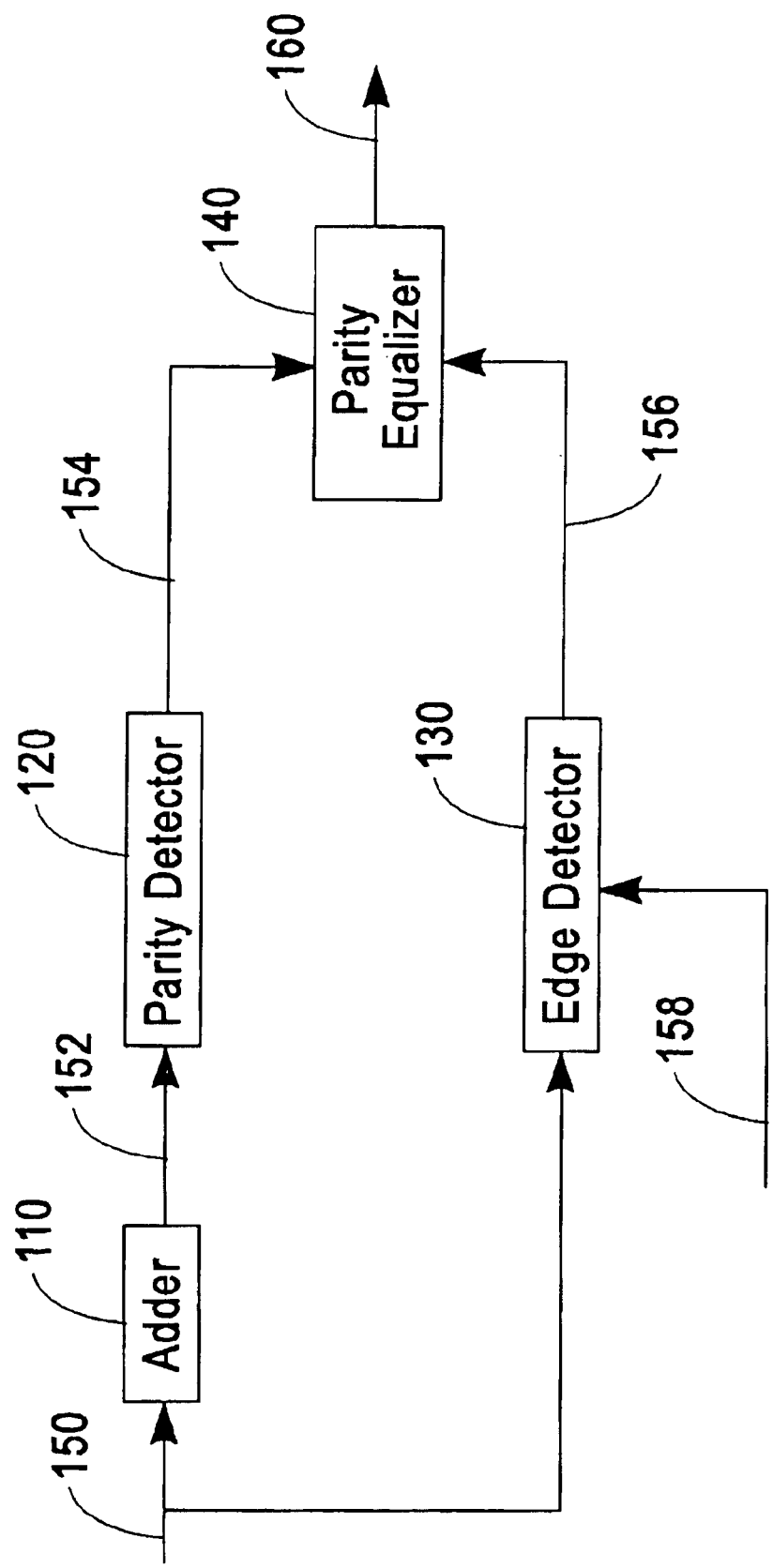
FIG. 1 is a block diagram of a parity grid function according to an embodiment of the present invention.

The principles of the preferred method, apparatus, and computer program product described herein have general applicability to indexed representations of information. For ease of explanation, the preferred method, apparatus, and computer program product are described herein with reference to an indexed representation of an image. However, it is not intended that the present invention be limited to the described method, apparatus, and computer program product. For example, the invention may have application to various other indexed representations such as sound recordings.

Generally, embedding of authentication information in an image requires that:

- the embedded information not distort the image beyond a limit that becomes perceptible to the human eye,
- the size of the image remains the same before and after the authentication information is embedded, and
- the authentication information should be reliably recoverable.

For purposes of this specification, an indexed image includes a digital or sampled representation of an actual visual image. Two key components of an indexed image include a data matrix and a colormap matrix, thus providing two options for embedding information. As colormaps can be substituted for a given data matrix to render the images in a different colormap and due to the fact that colormaps contain no image information, a data matrix is preferably used to embed information. A data matrix contains detailed image information such as variations in intensity, coloring information, etc. This information is captured in the pattern of the values contained in a data matrix.

The Concept of a Parity Grid

A parity grid is an invisible, virtual two-dimensional grid generated from the information contained in a data matrix. The rows and columns of this virtual grid typically correspond to alternate rows and columns of the data matrix. Once generated, the rows and columns of a parity grid can be altered in subtle or imperceptible ways at selected regions to contain encoded information. The encoded information can include signatures, watermarks, etc, which can be later recovered by detection techniques.

A parity grid is generated from an indexed image. A true color image can be converted to an indexed image using simple translation techniques. The parity grid provides hooks to build other useful structures on top of an indexed image such as for signature embedding.

Given that I is a data matrix that is representative of an image and PG is the parity grid generated from I, a function called the Parity Grid Function (pgf) exists that relates the parity grid PG to the data matrix (I):

$$PG = pgf(I).$$

The pgf function is used to generate a parity grid over an image and typically encodes every alternate row and alternate column of the data matrix for parity equalization at a given parity level. Parity equalization is a process whereby rows and columns are altered, if necessary, to conform to a given parity level.

Once a row has been altered after parity equalization, any further alterations to that row distorts the parity grid. So, when columns are subsequently parity equalized, regions near the edge locations of the columns must be available for alteration without affecting the already encoded rows. By providing alternate free rows, the row that is closest to the edge of the given column can be used for parity equalization.

FIG. 2 shows a parity grid 200 with rows R1, R2, . . . , R7 and columns C1, C2, . . . , C7. Alternate rows R2, R4 and R6 and alternate columns C2, C4 and C6 are selected to be parity-encoded. Consequently, non-encoded rows R1, R3, R5 and R7 and non-encoded columns C1, C3, C5 and C7 are free for column and row encoding, respectively.

Referring to FIG. 1, selected row and column data 150 of a data matrix are input to an adder 110 that calculates the sum 152 of the values of the data elements in each individual row and column. The sum 152 of each individual row and column is then input to a parity detector 120 that calculates a parity overshoot value 154 for each particular row and column. The parity overshoot value is calculated according to the formula:

$$\mathrm{parity\_overshoot} = \mathrm{mod}(\mathrm{sum}, \mathrm{parity\_level})$$

where:

sum is the value generated by the adder, and parity_level is a pre-defined integer to which all rows or columns and encoded.

The selected row and column data 150 of the data matrix are also input to an edge detector 130. The edge detector 130 determines regions of large intensity variation in the image, usually at the edges. Such regions can be used for intentional data alteration based on the principle that the human eye typically fails to perceive small changes introduced at regions where large variations already exist. Such regions are most likely to occur at edges in the image. The edge detector 130 locates these regions of large intensity variation and provides this edge information 156 to the parity equalizer 140.

Additional row/column information 158 may optionally also be input to the edge detector 130 to enable more robust edge detection. If the edge detector 130 is unable to detect an edge in a particular row/column, due to all the elements or pixels in that row/column being of similar value, the additional row/column information may assist in providing a perceptible edge. For example, an edge may be detected between elements in two separate rows rather than between elements within a single row.

Parity equalization operates on a given row or column and is calculated according to the formula:

row'/rolumn'=peq(parity_overshoot, edge_information)

where peq is the parity equalization function, row'/column' is modified row or column after parity equalization, parity_overshoot is the value generated by the parity detector, and edge_information is the locations of large variations detected by the edge detector.

The peq function alters values of the data matrix at the edges. A new value inserted at an edge location should satisfy the following two conditions:

The new value points to a value in the colormap matrix that varies little in intensity when compared to what was pointed to by the original value.

The more critical condition is that:

mod(row', parity_level)=0, where row' is the modified row after parity equalization, and parity_level is a pre-defined integer to which all rows or columns and encoded.

If new_int is the value of the new intensity that replaces the value old_int that was the value of the old intensity, then for the above to hold true, the following should also hold true:

mod(new_int-old_int-parity_restorer, parity_level)=0, where parity_restorer is the value that corresponds to the value of parity_overshoot in the lookup table.

The set of values of parity_overshoot for a parity_level of 5 is {0,1,2,3,4}. With a view to keeping distortion of the image to minimal levels, the above set can be mapped to a parity_restorer set such that the values greater than half the pre-defined parity_level integer can be eliminated as shown in Table 1 regarding parity restoration mapping:

TABLE 1

| Parity_overshoot | Parity_restorer |
|---|---|
| 0 | 0 |
| 1 | −1 |
| 2 | −2 |
| 3 | 2 |
| 4 | 1 |

Example of Row Parity Equalization in Parity Grid Generation

Consider a row vector [1 5 9 29 23 20], corresponding to a row of an indexed image, which is to be parity equalized for a parity level value of 5.

Firstly, the sum of elements of the row vector is calculated:

1+5+9+2+9+23+20=69.

Then, the parity overshoot is calculated:

mod(sum, parity level)=mod(69, 5)=4.

A position index for the row that corresponds to a region of maximum variation in the image is determined by means of edge detection:

index=5 (i.e. the fifth element in the row).

A parity restoration value is determined that causes the parity overshoot value to be zero (typically determined from a lookup table):

parity restoration value=1.

The nearest value in the color map that varies the least in intensity is 10, and this value satisfies the parity equalization condition:

mod(10−9−1, 5)=0.

Thus, the fifth element in the row (9) is replaced by the calculated value (10), which provides parity equalization of the row. The parity equalized row vector is thus:

[1 5 9 2 10 23 20].

Improved Data Matrix Alterations

Certain techniques may assist in reducing distortion of an image when altering the corresponding data matrix.

One such technique is to distribute an alteration value across multiple regions or edges. If the edge detector detects or can detect multiple edges (n) in a given row or column, then the alteration at the edges can be made to span over n element or pixel locations in that row or column. For example, if a given element should be increased by a value of 2, then the variation can be spread over 2 locations with each element increasing by a value of 1.

Another such technique involves encoding every third row instead of every alternate row. Referring to FIG. 3, rows R2 and R5 and columns C2 and C5 are encoded for the parity grid. Row R3 is thus available for column encoding and row R4 is available for storing additional information. In this manner, each non-coded third row can be used to hold additional information at the edges such as:

information regarding unique patterns that may be used to encrypt passwords and signature strings, and information regarding an edge element's or pixel's intensity increase or decrease, and by what value. This information is valuable when parity violations are performed so that the alterations can be neutralized to a large extent, thus minimising distortion.

Using the Parity Grid for Detecting Alterations to an Image

The parity-encoded rows and columns of a data matrix are processed to determine the parity overshoot value for each of those rows and columns, as described hereinbefore. A zero value of parity overshoot indicates that parity has been maintained, while a non-zero value indicates that the particular row or column has been altered. The intersection of a row and column of non-zero parity overshoot can be used to locate an actual region of alteration.

Figure 4A:
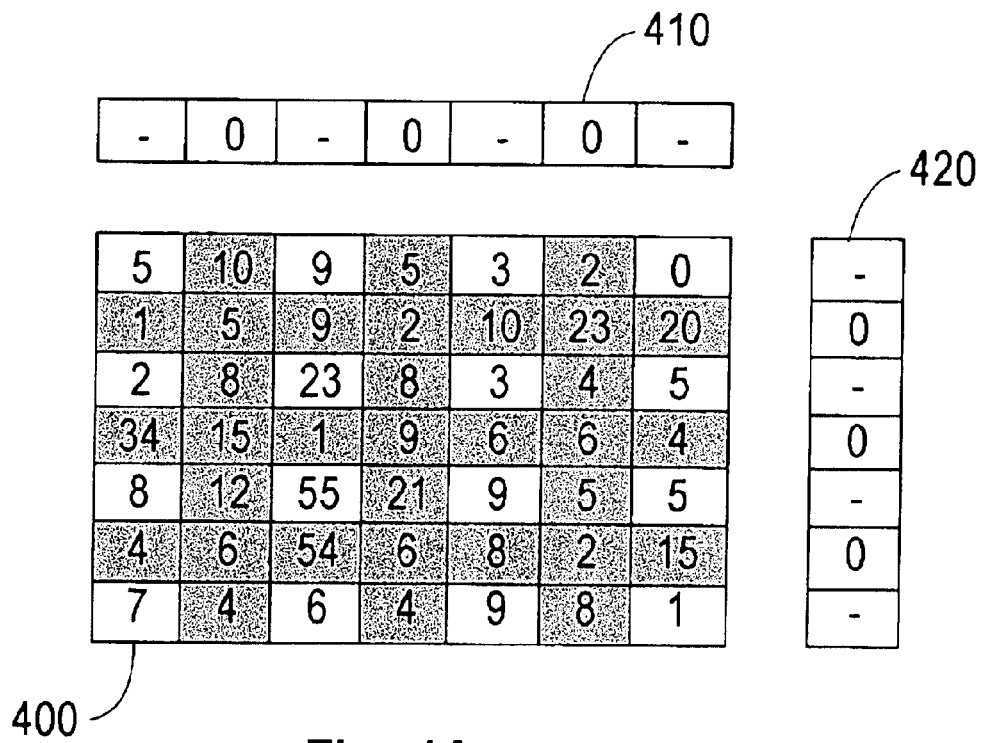
FIG. 4a shows a parity-equalized data matrix.
Figure 4B:
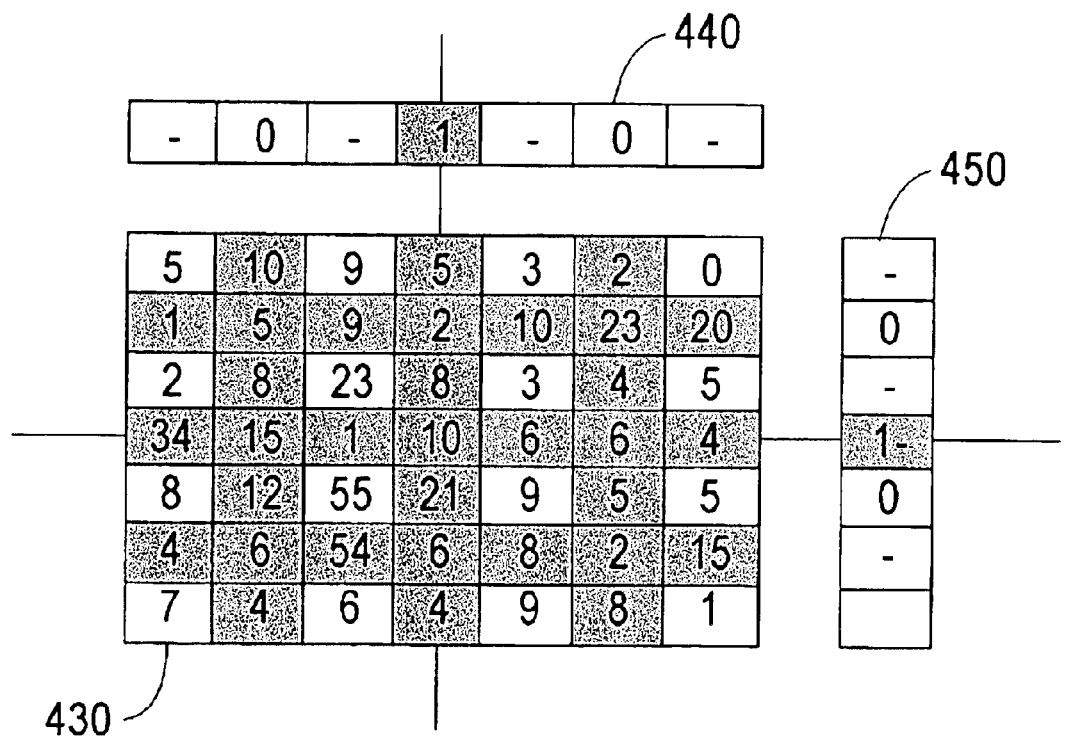
FIG. 4b shows the data matrix of FIG. 4a after subsequent alteration.

FIGS. 4a and 4b show a data matrix with and without alteration, respectively. FIG. 4a shows a data matrix 400 with a parity grid that comprises alternate, shaded rows and columns. A column parity vector 410 and row parity vector 420 contain zero parity overshoot values corresponding to each of the parity grid rows and columns, thus indicating that those rows and columns are all parity equalized. FIG. 4b shows a data matrix 430, an element of which (row 4, column 4) has been altered from that in the data matrix 400. The column parity vector 440 and row parity vector 450 contain non-zero parity overshoot values corresponding to column 4 and row 4, respectively. The presence of a parity overshoot value of '1' in the row and column parity vectors suggests that the data matrix was altered after generation of the parity grid. The intersection of the broken lines shown on FIG. 4b indicate the region of alteration, wherein the value '10' replaces the value '9', as originally contained in the data matrix 400 shown in FIG. 4a.

Using the Parity Grid for Embedding Information in an Image

Figure 5:
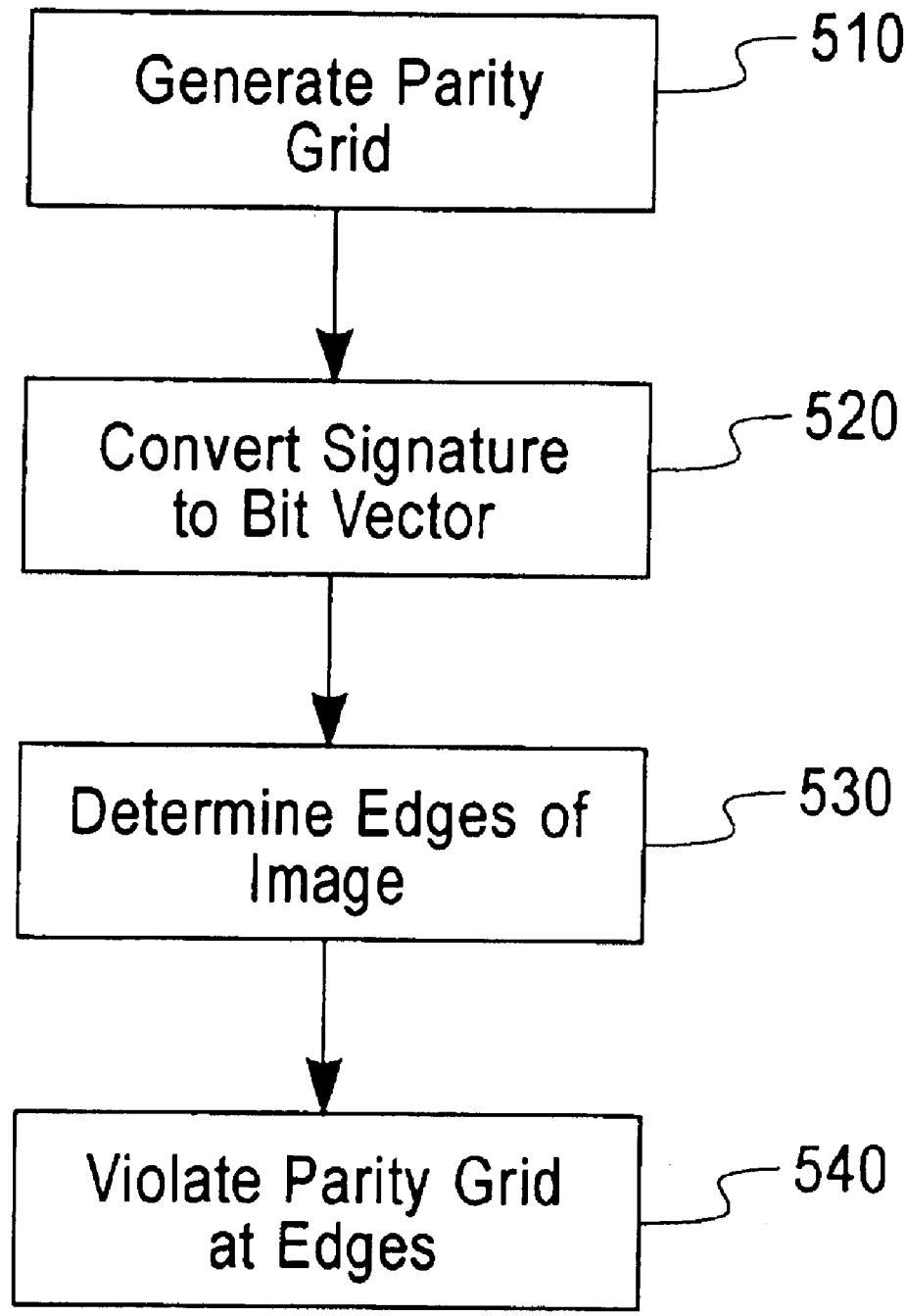
FIG. 5 is a flowchart of a method for signing images.

FIG. 5 is a flowchart of a method for signing images by embedding of information. At step 510, a parity grid is generated from an unsigned indexed image. A desired signature or password (typically in the form of an alphanumeric string) is converted to a bit vector, at step 520. The edges (regions of maximum intensity variation) of the image are detected by means of edge detection techniques at step 530. Then, at step 540, the parity grid is violated by altering the pixel intensity values at the detected edges to produce a signed image.

Figure 6:
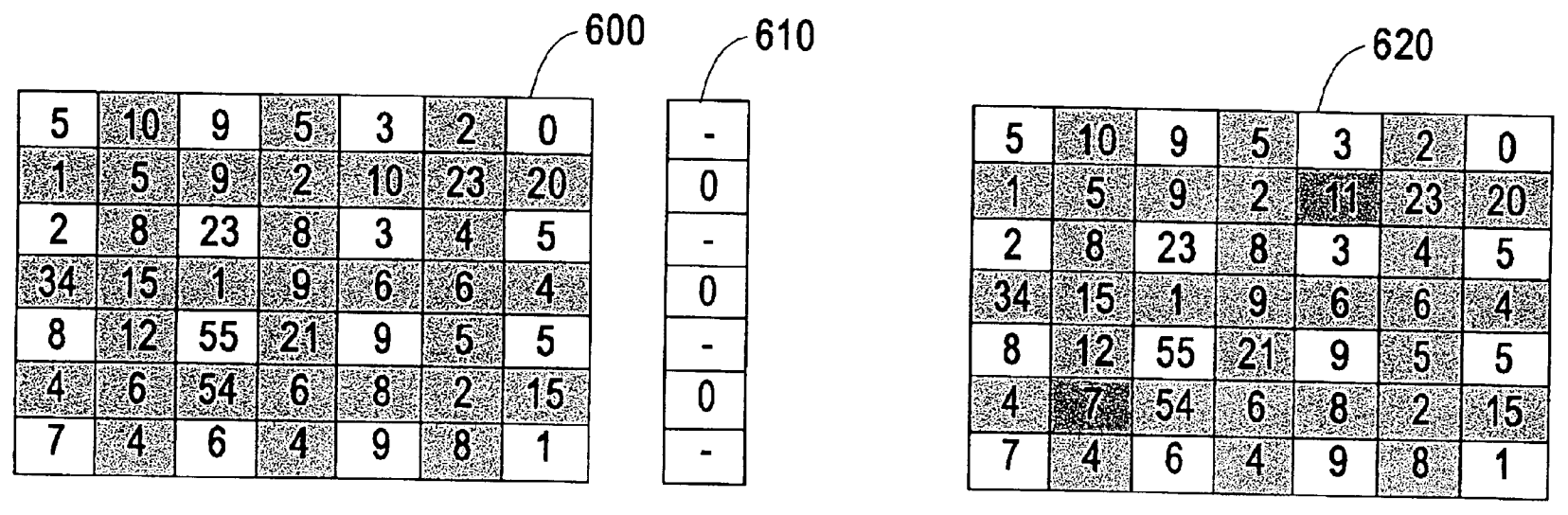

FIG. 6 shows a data matrix 600 before signature embedding, a signature vector 610, and a data matrix 620 that comprises the data matrix 600 with the signature vector 610 embedded therein. As can be seen from the signature vector 610, violation of the second and sixth rows of the parity grid are required. Given that edge detection identified element 5 in row 2 and element 2 in row 6 as representative of regions of greatest intensity variation in those rows, the values of these elements have been altered from '10' and '6' in data matrix 600 to '11' and '7' in data matrix 620, respectively.

The parity violations are such that that if the signature bit is '1', then the value of the edge representative location is increased by '1'. However, the edge element or pixel intensity in the violated rows was also altered when the parity grid was generated. Hence, the further alteration to sign the image may result in unacceptable distortion of the image.

Possible ways of overcoming this situation include:

keeping track of the alteration information (whether intensity increased or decreased) in a non-coded third row (refer to FIG. 6). Based on this information, a reverse process can be performed to offset two alterations against each other. For example, if the intensity at an edge was increased by two units during generation of the parity grid, the intensity can be decreased by two units during signature embedding.

instead of embedding signatures at the first set of edges detected, the subsequent set of edges could be used.

Retrieving Embedded Information from an Indexed Image

Figure 7:
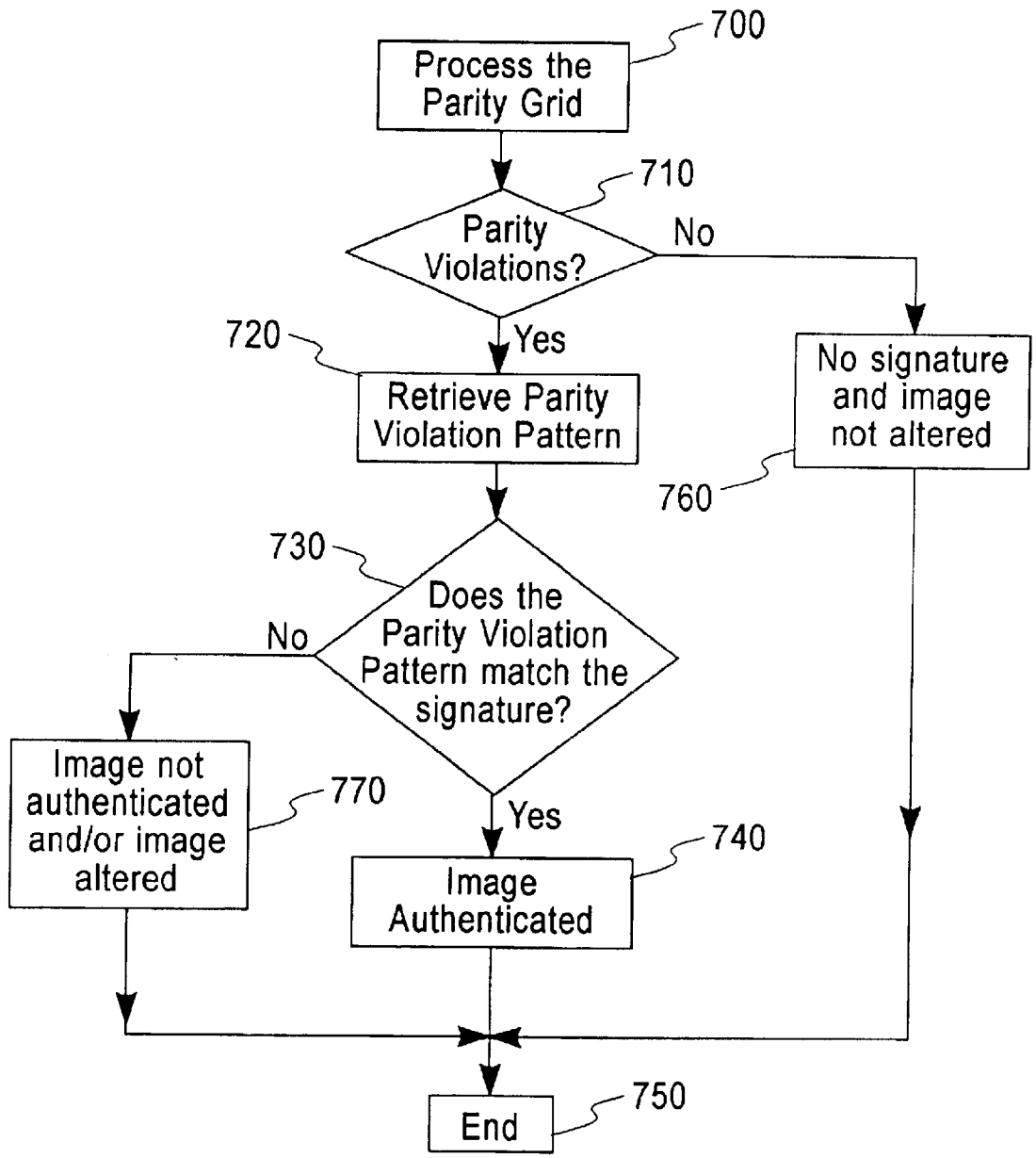
FIG. 7 is a flowchart of a method for signature retrieval and image authentication.

FIG. 7 is a flowchart showing the steps for retrieving a signature embedded in an image. At step 700, the indexed image or parity grid is processed to determine a parity overshoot value for each row and column, given a predetermined parity value. Then, at decision step 702, a determination is made whether any parity violations have occurred. A parity violation is indicated by a non-zero value of parity overshoot.

If parity violations are not detected (N), processing continues at step 760, where a determination is made that the image is not signed and the image has not been altered. Processing is completed at step 750.

If parity violations are detected (Y), the parity violation pattern is retrieved at step 720. Retrieval of a parity violation pattern is typically performed by combining the individual non-zero values of parity overshoot to reconstruct the embedded signature or information.

At decision step 730, a determination is made whether the retrieved parity violation pattern matches one or more signatures. If the parity violation pattern matches a signature (Y), the image is authenticated at step 740. Processing is completed at step 750.

If the parity violation pattern does not match a signature (N), it is determined, at step 770, that the image is not authenticated and/or the image has been altered. Processing is completed at step 750.

Figure 8:
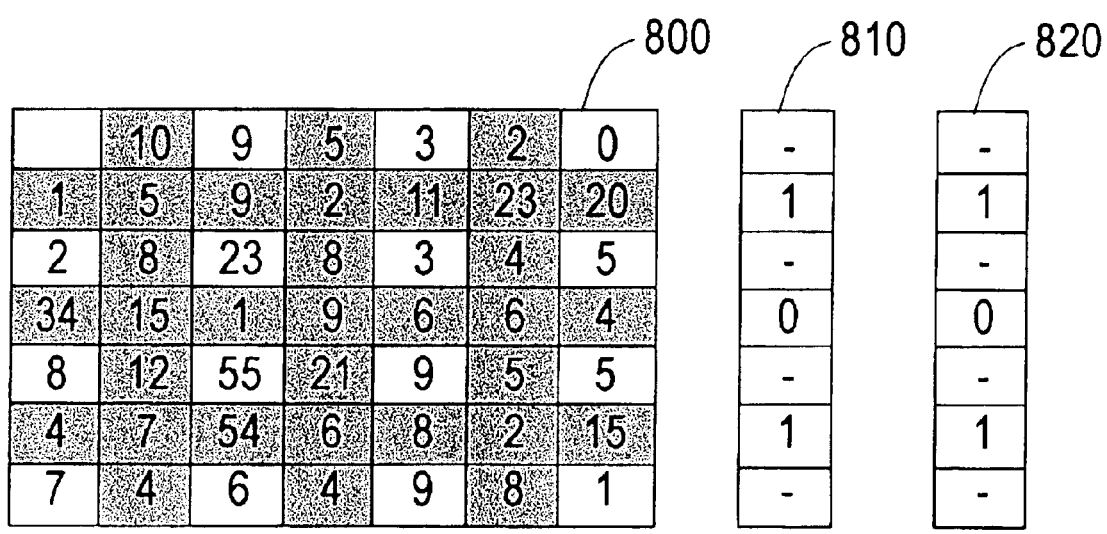
FIG. 8 shows comparison of an original signature with a signature extracted from an altered image.

FIG. 8 shows a successful instance of authentication by signature verification. The signature 810 is retrieved from the altered image 800, as described above with reference to FIG. 7. As can be seen in the altered image 800, the elements of the parity grid at row 2, column 5 and row 6, column 5 have been altered or violated. The actual signature 820 that was embedded in the original image matches the retrieved signature 810, thus providing authentication.

Edge Detection

Edge detection is a process whereby regions of greatest intensity variations are located. The actual elements of a data matrix are not the actual values of the image properties in the sense that these elements are merely pointers to the colormap that stores the actual color and intensity information. Since the data matrix is used to obtain the edge information, a necessary condition for obtaining accurate edges is to sort the colormap in increasing order of one of specified criteria. These criteria include:

Intensity variation,

Hue variation,

Saturation variation.

Based on the number of colors available, or whether the image is a gray scale image, one of the above criteria can be chosen to order the colormap. The data matrix is then altered to reflect the changes in the colormap. The following example of edge detection assumes that the colormap has been sorted by intensity.

FIG. 9 shows a data matrix 910, a row difference matrix 920, a column difference matrix 930, and an absolute sum matrix 940. Each of the matrices comprise 7 rows, R1, ..., R7, and 7 columns, C1, ..., C7.

The following steps comprise an exemplary procedure for edge detection along a row:

1. For the data matrix 910 (data_matrix), compute the row difference matrix 920 (row_dm) according to the formula:

$$\text{row\_dm}(i,j) = \text{data\_matrix}(i+1,j) - \text{data\_matrix}(i,j)$$

where
- i represents an index for columns C1, ..., C7, and
- j represents an index for rows R1, ..., R7.

2. Similarly compute the column difference matrix 930 (col_dm) according to the formula:

$$\text{col\_dm}(i,j) = \text{data\_matrix}(i,j+1) - \text{data\_matrix}(i,j)$$

where
- i represents an index for columns C1, ..., C7, and
- j represents an index for rows R1, ..., R7.

Note: The last row and column of the row difference matrix 920 and the column difference matrix 930, respectively, are calculated assuming that the last row or column is similar in intensity to the previous row or column, respectively.

3. The actual process of edge detection is based on evaluating one level of row and column values. A given pixel is detected as an edge if the next pixel has the maximum absolute variation in intensity along that row as well as along the corresponding column. Thus, the absolute values of the row difference mattrix 920 and the column difference matrix 930 are added for each row to produce the absolute sum matrix 940. Then, the maximum value in the row is identified. The pixels of maximum value correspond to the maximum variation (edges) and are shown as shaded cells in the absolute sum matrix 940.

4. In case several edges are detected, depending on the number of pixels used in the parity equalization process, the last 'n' pixels can be used and the rest ignored, where 'n' is the number of pixels used for parity equalization.

The index for the absolute sum matrix 940 starts from (1,1), as before. However, the intensity variation in the difference matrices 920 and 930 is between pairs of pixels. The difference matrices give the second pixel of each pair of pixels. Since the first pixel of the pair is required, the edge detection algorithm returns indices that are one less than the largest value found in that row. In case any column index happens to be 0, the original value is returned.

For example, in row 2, the edge is detected for the pixel pair at location (2,5) and (2,6). The edge detection algorithm identifies location (2,6) as the largest variation in intensity (see the absolute sum matrix 940) and returns the value (2,5) as the actual location where the intensity is to be altered.

The final locations for intensity alterations are thus (1,5), (2,5), (3,0) (changed to (3,1)), (4,2), (5,1), (6,2), and (7,2). A similar procedure applies for detecting edges along the columns.

Computer Implementation

Figure 10:
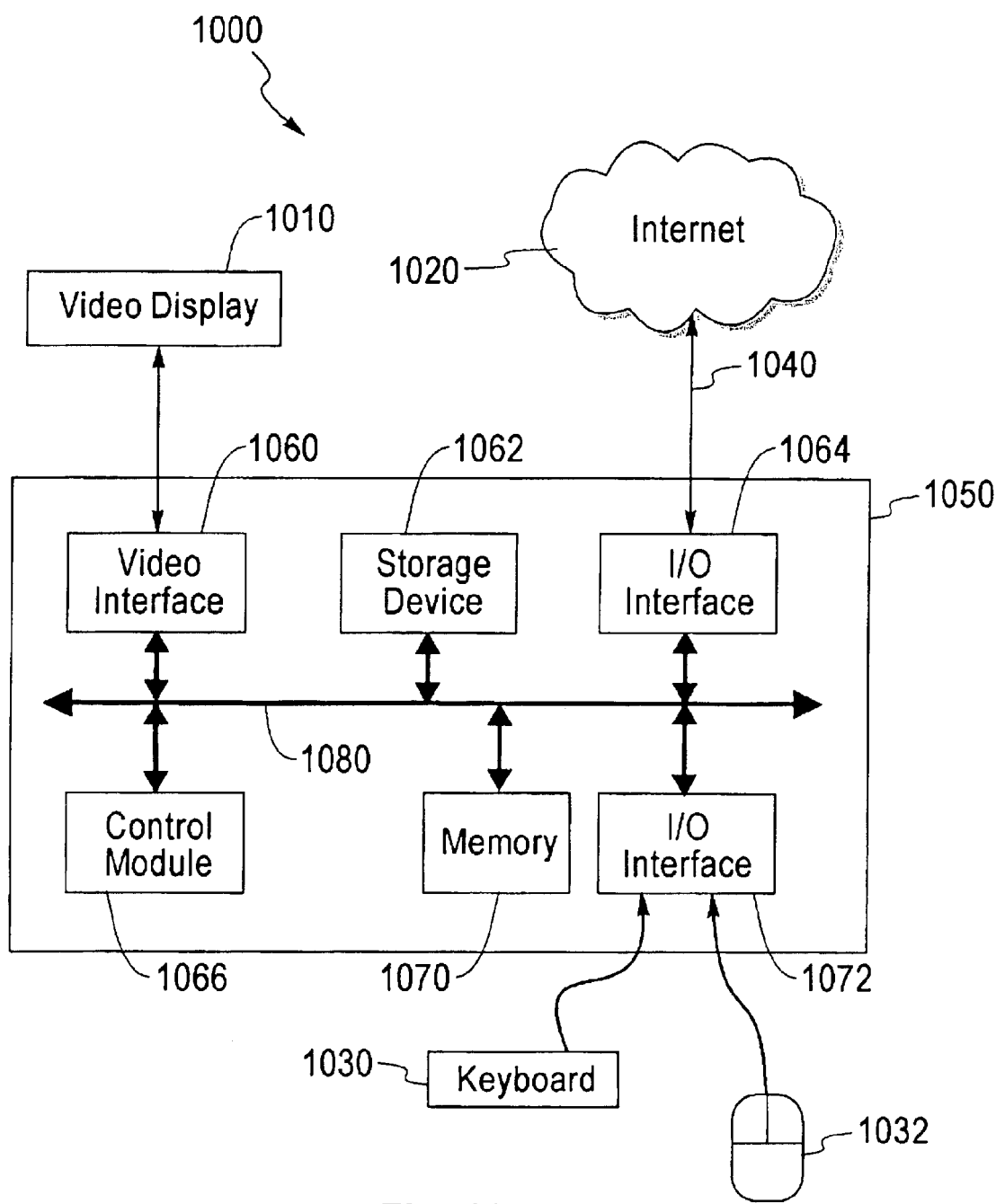
FIG. 10 is a block diagram of a computer system wherewith the present invention can be practised.

The methods described herein can be implemented using a computer program product in conjunction with a computer system 1000 as shown in FIG. 10. In particular, the methods can be implemented as software, or computer readable program code, executing on the computer system 1000.

The computer system 1000 includes a computer 1050, a video display 1010, and input devices 1030, 1032. In addition, the computer system 1000 can have any of a number of other output devices including line printers, laser printers, plotters, and other reproduction devices connected to the computer 1050. The computer system 1000 can be connected to one or more other computers via a communication interface 1064 using an appropriate communication channel 1040 such as a modem communications path, an electronic network, or the like. The network may include a local area network (LAN), a wide area network (WAN), an Intranet, and/or the Internet 1020.

The computer 1050 includes the control module 1066, a memory 1070 that may include random access memory (RAM) and read-only memory (ROM), a communications interface 1064, an input/output (I/O) interface 1072, a video interface 1060, and one or more storage devices generally represented by the storage device 1062. The control module 1066 is implemented using a central processing unit (CPU) that executes or runs a computer readable program code that performs a particular function or related set of functions.

The video interface 1060 is connected to the video display 1010 and provides video signals from the computer 1050 for display on the video display 1010. User input to operate the computer 1050 can be provided by one or more of the input devices 1030, 1032 via the I/O interface 1072. For example, a user of the computer 1050 can use a keyboard as I/O interface 1030 and/or a pointing device such as a mouse as I/O interface 1032. The keyboard and the mouse provide input to the computer 1050. The storage device 1062 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 1050 is typically connected to other devices via a bus 1080 that in turn can consist of data, address, and control buses.

The method steps are effected by instructions in the software that are carried out by the computer system 1000. Again, the software may be implemented as one or more modules for implementing the method steps.

In particular, the software may be stored in a computer readable medium, including the storage device 1062 or that is downloaded from a remote location via the communications interface 1064 and communications channel 1040 from the Internet 1020 or another network location or site. The computer system 1000 includes the computer readable medium having such software or program code recorded such that instructions of the software or the program code can be carried out.

The computer system 1000 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 1066. Intermediate storage of the program code and any data including entities, tickets, and the like may be accomplished using the memory 1070, possibly in concert with the storage device 1062.

In some instances, the program may be supplied to the user encoded on a CD-ROM or a floppy disk (both generally depicted by the storage device 1062), or alternatively could be read by the user from the network via a modem device connected to the computer 1050. Still further, the computer system 1000 can load the software from other computer readable media. This may include magnetic tape, a ROM or integrated circuit, a magneto-optical disk, a radio or infrared transmission channel between the computer and another device, a computer readable card such as a PCMCIA card, and the Internet 1020 and Intranets including email transmissions and information recorded on Internet sites and the like. The foregoing are merely examples of relevant computer readable media. Other computer readable media may be practised without departing from the scope and spirit of the invention.

The methods can be realised in a centralised fashion in one computer system 1000, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

The foregoing describes only a few methods, apparatus and computer program products according to embodiments of the present invention, and modifications and/or changes can be made thereto without departing from the scope and spirit of the invention, the arrangements and/or embodiments being illustrative and not restrictive.

I claim:

1. A method for generating a parity grid matrix from an indexed representation of an image, said method including the steps of:

calculating a parity value for each of specified rows and columns of said indexed representation;

determining a parity restoration value for each of said specified rows and columns that exhibit a non-zero parity value; and adding said parity restoration values to one or more selected elements of said specified rows and columns that exhibit a non-zero parity value.

2. A method according to claim 1, wherein said indexed image comprises a data matrix.

3. A method according to claim 1, wherein said specified rows and columns comprise alternate rows and columns of said indexed image.

4. A method according to claim 1, wherein said specified rows and columns comprise every third row and every third column of said indexed image.

5. A method according to claim 1, wherein said step of calculating a parity value for one of said specified rows or columns includes the sub-steps of:

calculating the sum of the elements contained in said selected row or column; and calculating the modulus of said sum and a selected integer value of parity level.

6. A method according to claim 1, wherein said selected elements are selected by an edge detection process.

7. A method according to claim 6, wherein said edge detection process identifies regions of greatest variation in said image, said variation selected from the group consisting of:

intensity variation;

hue variation; and saturation variation.

8. A method for detecting alterations to an image, said method including the steps of:

calculating a parity value for each of specified rows and columns of a parity grid encoded representation of said image; and determining each non-zero occurrence of said parity values, each said non-zero occurrence being indicative of a row or column containing one or more altered elements.

9. A method according to claim 8, wherein the intersection of a row of non-zero parity value and a column of non-zero parity value is indicative of the location of an alteration to said image.

10. A method for embedding information in an image, said method including the steps of:

generating a parity grid matrix from an indexed representation of said image;

selecting elements of said parity grid matrix for alteration; and altering said selected elements according to a representation of said information.

11. A method according to claim 10, wherein said selected elements are selected by an edge detection process.

12. A method according to claim 11, wherein said edge detection process identifies regions of greatest variation in said image, said variation selected from the group consisting of:

intensity variation;

hue variation; and saturation variation.

13. A method for retrieving information embedded in an image, said method including the steps of:

calculating a parity value for each of specified rows and columns of a parity grid encoded representation of said image; and combining each non-zero value of said parity values to reconstruct said embedded information, said information being embedded in said image by alteration of said parity grid encoded representation of said image.

14. A method according to claim 13, wherein said step of calculating a parity value for one of said specified rows or columns includes the sub-steps of:

calculating the sum of the elements contained in said selected row or column; and calculating the modulus of said sum and a selected integer value of parity level.

15. An apparatus for generating a parity grid matrix from an indexed representation of an image including:

means for calculating a parity value for each of specified rows and columns of said indexed representation;

means for determining a parity restoration value for each of said specified rows and columns that exhibit a non-zero parity value; and means for adding said parity restoration values to one or more selected elements of said specified rows and columns that exhibit a non-zero parity value.

16. An apparatus according to claim 15, wherein said indexed image comprises a data matrix.

17. An apparatus according to claim 15, wherein said specified rows and columns comprise alternate rows and columns of said indexed image.

18. An apparatus according to claim 15, wherein said specified rows and columns comprise every third row and every third column of said indexed image.

19. An apparatus according to claim 15, wherein said means for calculating a parity value for one of said specified rows or columns includes:

means for calculating the sum of the elements contained in said selected row or column; and means for calculating the modulus of said sum and a selected integer value of parity level.

20. An apparatus according to claim 15, further including edge detection means for selecting said selected elements.

21. An apparatus according to claim 20, wherein said edge detection means is adapted to identify regions of greatest variation in said image, said variation selected from the group consisting of:

intensity variation;

hue variation; and saturation variation.

22. An apparatus for detecting alterations to an image including:

means for calculating a parity value for each of specified rows and columns of a parity grid encoded representation of said image; and means for determining each non-zero occurrence of said parity values, each said non-zero occurrence being indicative of a row or column containing one or more altered elements.

23. An apparatus according to claim 22, wherein the intersection of a row of non-zero parity value and a column of non-zero parity value is indicative of the location of an alteration to said image.

24. An apparatus for embedding information in an image including:

means for generating a parity grid matrix from an indexed representation of said image;

means for selecting elements of said parity grid matrix for alteration; and means for altering said selected elements according to a representation of said information.

25. An apparatus according to claim 24, wherein said means for selecting said selected elements comprises edge detection means.

26. An apparatus according to claim 25, wherein said edge detection means identifies regions of greatest variation in said image, said variation selected from the group consisting of:

intensity variation;

hue variation; and saturation variation.

27. An apparatus for retrieving information embedded in an image including:

means for calculating a parity value for each of specified rows and columns of a parity grid encoded representation of said image; and means for combining each non-zero value of said parity values to reconstruct said embedded information, said information being embedded in said image by alteration of said parity grid encoded representation of said image.

28. An apparatus according to claim 27, wherein said means for calculating a parity value for one of said specified rows or columns includes:

means for calculating the sum of the elements contained in said selected row or column; and means for calculating the modulus of said sum and a selected integer value of parity level.

29. A computer program product having a computer readable medium having a computer program recorded therein for generating a parity grid matrix from an indexed representation of an image, said computer program product including:

computer program code means for calculating a parity value for each of specified rows and columns of said indexed representation;

computer program code means for determining a parity restoration value for each of said specified rows and columns that exhibit a non-zero parity value; and computer program code means for adding said parity restoration values to one or more selected elements of said specified rows and columns that exhibit a non-zero parity value.

30. A computer program product according to claim 29, wherein said indexed image comprises a data matrix.

31. A computer program product according to claim 29, wherein said specified rows and columns comprise alternate rows and columns of said indexed image.

32. A computer program product according to claim 29, wherein said specified rows and columns comprise every third row and every third column of said indexed image.

33. A computer program product according to claim 29, wherein said computer program code means for calculating a parity value for one of said specified rows or columns includes:

computer program code means for calculating the sum of the elements contained in said selected row or column; and computer program code means for calculating the modulus of said sum and a selected integer value of parity level.

34. A computer program product according to claim 29, further including computer program code means for edge detection to select said selected elements.

35. A computer program product according to claim 34, wherein said computer program code means for edge detection is adapted to identify regions of greatest variation in said image, said variation selected from the group consisting of:

intensity variation;

hue variation; and saturation variation.

36. A computer program product product having a computer readable medium having a computer program recorded therein for detecting alterations to an image, said computer program product including:

computer program code means for calculating a parity value for each of specified rows and columns of a parity grid encoded representation of said image; and computer program code means for determining each non-zero occurrence of said parity values, each said non-zero occurrence being indicative of a row or column containing one or more altered elements.

37. A computer program product according to claim 36, wherein the intersection of a row of non-zero parity value and a column of non-zero parity value is indicative of the location of an alteration to said image.

38. A computer program product product having a computer readable medium having a computer program recorded therein for embedding information in an image, said computer program product including:

computer program code means for generating a parity grid matrix from an indexed representation of said image;

computer program code means for selecting elements of said parity grid matrix for alteration; and computer program code means for altering said selected elements according to a representation of said information.

39. A computer program product according to claim 38, wherein said computer program code means for selecting said selected elements comprises computer program code means for edge detection.

40. A computer program product according to claim 39, wherein said computer program code means for edge detection identifies regions of greatest variation in said image, said variation selected from the group consisting of:

intensity variation;

hue variation; and saturation variation.

41. A computer program product product having a computer readable medium having a computer program recorded therein for retrieving information embedded in an image, said computer program product including:

computer program code means for calculating a parity value for each of specified rows and columns of a parity grid encoded representation of said image; and computer program code means for combining each non-zero value of said parity values to reconstruct said embedded information, said information being embedded in said image by alteration of said parity grid encoded representation of said image.

42. A computer program product according to claim 41, wherein said computer program code means for calculating a parity value for one of said specified rows or columns includes:

computer program code means for calculating the sum of the elements contained in said selected row or column; and computer program code means for calculating the modulus of said sum and a selected integer value of parity level.

* * * * *